(12) United States Patent
Sha

(10) Patent No.: US 11,887,499 B2
(45) Date of Patent: Jan. 30, 2024

(54) VIRTUAL-SCENE-BASED LANGUAGE-LEARNING SYSTEM AND DEVICE THEREOF

(71) Applicant: Ailin Sha, Boston, MA (US)

(72) Inventor: Ailin Sha, Boston, MA (US)

(73) Assignee: Ailin Sha, Boston, MA (US)

( * ) Notice: Subject to any disclaimer, the term of this patent is extended or adjusted under 35 U.S.C. 154(b) by 182 days.

(21) Appl. No.: 17/305,686

(22) Filed: Jul. 13, 2021

(65) Prior Publication Data

US 2022/0293008 A1  Sep. 15, 2022

(30) Foreign Application Priority Data

Mar. 9, 2021 (CN) .......................... 202110266215.8

(51) Int. Cl.
*G09B 19/06* (2006.01)
*G09B 5/02* (2006.01)
*G06F 3/01* (2006.01)

(52) U.S. Cl.
CPC ............. *G09B 19/06* (2013.01); *G06F 3/012* (2013.01); *G06F 3/015* (2013.01); *G09B 5/02* (2013.01)

(58) Field of Classification Search
CPC .............. G09B 19/06; G09B 5/02; G06F 3/01
See application file for complete search history.

(56) References Cited

U.S. PATENT DOCUMENTS

| | | | | |
|---|---|---|---|---|
| 6,229,548 B1* | 5/2001 | Edmark | ................... | G06T 15/10 345/427 |
| 2003/0195853 A1* | 10/2003 | Mitchell | ................... | G09B 5/00 705/51 |
| 2006/0067573 A1* | 3/2006 | Parr | ........................ | G06F 18/00 382/154 |
| 2008/0033712 A1* | 2/2008 | Yang | ...................... | G09B 19/06 704/3 |

(Continued)

FOREIGN PATENT DOCUMENTS

| | | |
|---|---|---|
| CN | 1744071 A | 3/2006 |
| CN | 108153415 A | 6/2018 |

(Continued)

*Primary Examiner* — Eddy Saint-Vil
(74) *Attorney, Agent, or Firm* — Michael Ye; Rimon Law

(57) ABSTRACT

The present invention relates a virtual-scene-based language-learning system, at least comprising a scheduling and managing module and a scene-editing module, and the system further comprises an association-analyzing module, the scheduling and managing module are connected to the scene-editing module and the association-analyzing module, respectively, in a wired or wireless manner, the association-analyzing module analyzes based on second-language information input by a user and provides at least one associated image and/or picture, and the association-analyzing module displays the associated images and/or picture selected by the user on a client, so that a teacher at the client is able to understand the language information expressed in the second language by the student based on the associated image and/or picture. The present invention displays associated image by setting up an association-analyzing module, which (Continued)

can promote teachers' understanding of students' expression content, thereby providing effective language guidance and improving language learning efficiency.

18 Claims, 1 Drawing Sheet

(56) References Cited

U.S. PATENT DOCUMENTS

| | | | | |
|---|---|---|---|---|
| 2008/0254424 | A1* | 10/2008 | Cohen | G09B 7/04 |
| | | | | 434/308 |
| 2011/0014594 | A1* | 1/2011 | Chen | G09B 19/06 |
| | | | | 434/157 |
| 2012/0206577 | A1* | 8/2012 | Guckenberger | G09B 19/003 |
| | | | | 348/47 |
| 2013/0108994 | A1* | 5/2013 | Srinivasa | G09B 21/009 |
| | | | | 434/156 |
| 2014/0046661 | A1* | 2/2014 | Bruner | G09B 21/009 |
| | | | | 704/235 |
| 2016/0117953 | A1* | 4/2016 | Lluch | G09B 7/06 |
| | | | | 434/188 |
| 2017/0092151 | A1* | 3/2017 | Xi | G09B 19/06 |
| 2022/0150285 | A1* | 5/2022 | Okina | G06T 7/20 |

FOREIGN PATENT DOCUMENTS

| | | |
|---|---|---|
| CN | 109064799 A | 12/2018 |
| CN | 110033654 A | 7/2019 |
| CN | 110264826 A | 9/2019 |

\* cited by examiner

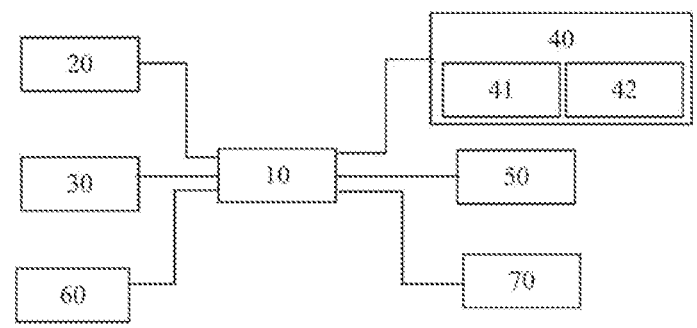

VIRTUAL-SCENE-BASED LANGUAGE-LEARNING SYSTEM AND DEVICE THEREOF

CROSS-REFERENCE TO RELATED APPLICATIONS

This application claims the benefit of the Chinese Patent Applications No. CN202110266215.8 filed on Mar. 9, 2021, which is hereby incorporated by reference as if fully set forth herein.

BACKGROUND OF THE INVENTION

1. Technical Field

The present invention relates to language-learning technologies, and more particularly to a virtual-scene-based language-learning system and its device.

2. Description of Related Art

As international exchange gets more and more frequent, learning language has become a fundamental way to improve life quality and daily communication. The objective of learning language is to make one use a language with fluency. Traditionally, languages are learnt in classrooms. Meany researches, however, show that well performing students are often fostered through "instructions" given by instructors inside and outside classrooms rather than "teaching" made by lecturers.

Learning a foreign language well is not a thing totally depending on classroom programs. Instead, self-learning and daily practice are of great importance. This means that creation of an environment in which students can learn and use a language is significant. Since life contains various aspects, there are various scenarios for language learning. For learning a language better, students have to master not only the language as a tool but also diverse culture information the language may communicate. The most effective way to learn a language is to transfer a student to the place of origin of that language. However, this is not realistic to most people. The objective of learning a language is to use it well. Therefore, it is believed that a virtual language-learning environment in which lecture and practice are combined would be helpful to effective language learning and contributive to flexible use of the learnt languages by the students. As attempts to realize such an environment, some prior-art disclosures have implemented virtual reality (hereinafter referred to as "VR") to provide virtual learning scenes.

For example, China Patent No. CN110264826A discloses a VR-based culture learning system and a method thereof for technically improving the prior art in terms of teacher-student interaction, course versatileness, and learning integration. The learning system includes a scenario building module, a learning test module, an interactive learning module and a result output module. The learning method includes: the scenario building module constructing cultural knowledge learning scenes and cultural skill learning scenes; the learning test module measuring how a user manage cultural knowledge and cultural skill before and after learning; the user using VR equipment of the interactive learning module to learn language communication knowledge and culture background knowledge in the culture knowledge learning scenes, and to learn culture custom behaviors in the culture skill learning scenes; and the result output module, according to measurement from the learning test module, calculating learning scores of the user to determine a consolidated learning result and output the result. The prior disclosure is useful for cultural learning in a VR environment.

China Patent No. CN108153415A discloses a VR language teaching interaction method and VR equipment for the method. The method includes: displaying a virtual scene generated in advance, the virtual scene containing a virtual interactive character and plural articles; upon receipt of selection operation acted on the articles from a user, controlling the virtual interactive character to output pronunciation voices corresponding to the selected articles using a predetermined language, for the user to follow the pronunciation voices; and upon receipt of a voice input by the user, controlling the virtual interactive character to use the predetermined language output a feedback voice related to the input language. By implementing the embodiment of this prior disclosure, VE equipment can be used more wisely during language learning, in turn improving language learning efficiency.

China Patent No. CN110033654A discloses a VR-based immersive language-learning system, including: a VR game realization module: for developing a language learning game suitable for VR equipment; a VR video realization module: for shooting panoramic videos, and performing later-stage editing such as sewing and adjusting the videos to generate a language learning video; a function interface module: for linking the language learning game and the language learning video, and performing revision; providing operation to the VR equipment and/or a GoPro; and the VR equipment: for providing an immersive environment in which the language learning game and the language learning video are presented.

China Patent No. CN1744071 discloses a virtual scene interactive language-learning system and its method, which use a server/client structure to mimic a real language-using environment for a user to learn a language in a specific scene. The current state of a scene is determined through data exchange between the client and the server end. According to the state of the scene, elements in the scene are edited in a circular manner. The edited interface is then presented to the client for receiving voice data input by the user through the client and presenting a response accordingly at the client, thereby helping the user to use the language flexibly.

China Patent No. CN109064799A discloses a VR-based language training system and a method thereof, which involve VR technology and try to improve foreign language learning efficiency by soling problems of the prior art. The prior disclosure uses VR interactive devices as well as VR glasses and voice communication equipment connected to the VR interactive device. The VR interactive device includes plural curriculum modules, each of which has corresponding curriculum virtual scenes and curriculum virtual characters. A user uses the VR glasses can see the curriculum virtual scenes and the curriculum virtual character corresponding to the selected curriculum module, and can initiate real-time voice communication using the voice communication equipment with the corresponding curriculum virtual characters. When the voice communication equipment identifies a failed voice input of the user, relevant prompt information is provided to the user. This creates an immersive virtual interaction environment for language learning, thereby effectively improving learning efficiency and learning performance.

While the foregoing known approaches do provide students of languages with VR-based learning scenes that facilitate efficient learning, they leave the needs for autonomous scene adjustment, language communication, real-time feedback and automatic correction unaddressed, thus making their language learning effects vulnerable. Specifically, these prior-art systems mainly output correct expressions in response to inputs from students, without encouraging the students to do self-correction the virtual scenes, and this leads to compromised language learning effects. In addition, ideal VR-based language learning is one that allows students to perform personalized representation with the assistance of various articles and gestures, helps teachers and students to fully understand each other, and provides meaningful feedback. Nevertheless, students using the existing systems are restricted to express themselves using only templated phrases and sentences. Oral expressions such made tend to be rigid, less flexible, and even unnatural.

Hence, the inventor wants to provide a language-learning system that enables students to learn languages in virtual scenes through personalized and enriched interaction with teachers by allowing students to autonomously adjust the virtual scenes and to receive real-time feedback from the teachers.

Further, since there is certainly discrepancy between the prior art comprehended by the applicant of this patent application and that known by the patent examiners and since there are many details and disclosures disclosed in literatures and patent documents that have been referred by the applicant during creation of the present invention not exhaustively recited here, it is to be noted that the present invention shall actually include technical features of all of these prior-art works, and the applicant reserves the right to supplement the application with technical features known in the art as support.

SUMMARY OF THE INVENTION

In order to solve the problems of existing knowledge, the present invention provides a virtual-scene-based language-learning system, at least comprising a scheduling and managing module (10) and a scene-editing module (40), being characterized in that the system further comprises an association-analyzing module (60), the scheduling and managing module (10) are connected to the scene-editing module (40) and the association-analyzing module (60), respectively, in a wired or wireless manner, the association-analyzing module (60) analyzes based on second-language information input by a user and provides at least one associated image and/or picture, and the association-analyzing module (60) displays the associated images and/or picture selected by the user on a client, so that a teacher at the client is able to understand the language information expressed in the second language by the student based on the associated image and/or picture.

Preferably, the association-analyzing module (60) analyzes based on first-language information in a first language input by the user and provides at least one associated image and/or picture, the association-analyzing module (60) displays the associated image and/or picture selected by the user at least one client, the teacher at the client is able to instruct the student based on the associated image and/or picture to express the language information in the second language.

Preferably, the scene-editing module (40), according to a movement information input by at least one smart wearable device and/or somatosensory device, controls movement of a virtual character to mimic movements of the user, thereby allowing the user to perform interaction in a virtual scene based on a combination of the second language and a movement language.

Preferably, the scene-editing module (40), according to a facial-expression information of user input by at least one smart wearable device and/or somatosensory device, modulates facial-expression information of an associated virtual character, thereby allowing the user to communicate in a virtual scene using lifelike facial expressions and the second language.

Preferably, the system further comprises an aiding module (70), the aiding module (70), according to first-language information input by the user, provides at least one second-language key word associated with the first-language information for the user to express information in the second language, and/or the aiding module (70), according to first-language information input by the user, provides at least one template sentence expressed in the second language for the user to express the information in the second language.

Preferably, the aiding module (70), according to a virtual object in the virtual scene designated by the user, displays at least one associated word or sentence using a designated second language and/or third language.

Preferably, the aiding module (70), according to daily use frequency of the second-language key words associated with virtual objects in virtual scenes, sets a display order of the second language key words.

Preferably, the scene-editing module (40) displays two-dimensional scenes and three-dimensional virtual scenes in a parallel manner, and the scene-editing module (40), in response to operations made by the user to the two-dimensional virtual scene, displays the corresponding three-dimensional virtual scene in a three-dimensional view.

The present invention further provides a virtual-scene-based language-learning device, at least comprising a scheduling and managing module (10) and a scene-editing module (40), being characterized in that the system further comprises an association-analyzing module (60), the scheduling and managing module (10) are connected to the scene-editing module (40) and the association-analyzing module (60), respectively, in a wired or wireless manner, the association-analyzing module (60) analyzes based on second-language information input by a user and provides at least one associated image and/or picture, and the association-analyzing module (60) displays the associated images and/or picture selected by the user on a client, so that a teacher at the client is able to understand the language information expressed in the second language by the student based on the associated image and/or picture.

Preferably, the scene-editing module (40), according to a movement information input by at least one smart wearable device and/or somatosensory device, controls movement of a virtual character to mimic movements of the user, thereby allowing the user to perform interaction in a virtual scene based on a combination of the second language and a movement language.

The present invention provides the following technical benefits:

(1) The association-analyzing module (60) provides associated images that facilitate understanding and communication between teachers and students, thereby giving the teachers opportunities to provide students with relevant expression instructions in the second language;

(2) The scene-editing module (40) works according to the association analysis performed by the association-analyzing module (60), and helps teachers to better understand what exactly students want to express in the second language through virtual scenes, thereby giving the teachers opportunities to provide students with relevant expression instructions in the second language;

(3) The scene-editing module (40) implements DOF definition to help teachers to manage and instruct students in virtual scenes efficiently, thereby preventing time waste and ineffective communication caused by an excessively large virtual scene;

(4) With DOF areas well defined by the scene-editing module (40), students in virtual scenes can perform communication focused on selected themes, thereby improving learning efficiency; and (5) The reviewing module helps students to better manage the second language and prevent ineffective learning.

BRIEF DESCRIPTION OF THE DRAWINGS

FIG. 1 is a logic module diagram of a language-learning system of the present invention.

DETAILED DESCRIPTION OF THE INVENTION

The following description details the present invention with reference to the accompanying drawings.

In view of the shortcomings of the prior art, the present invention provides a virtual-scene-based language-learning system and a device thereof. The present invention further provides a virtual-scene-based multi-language interaction system. The present invention may also be referred to as a language learning auxiliary system and a device thereof, or referred to as a language learning communication system and a device thereof.

For the purpose of the present invention, a first language refers to a first language of a user, a second language refers to a foreign language a user wants to learn, and a third language refers to another, second foreign language a user wants to learn.

The virtual-scene-based language-learning system of the present invention at least comprises a scene database (50), a registration module (20), a scheduling and managing module (10), a scene-editing module, an aiding module (70), an association-analyzing module (60) and a de-registration module (30).

The database, the registration module (20), the scheduling and managing module (10), the scene-editing module (40), the interaction module, the aiding module (70), the association-analyzing module (60) and the de-registration module (30) may each be one or more of a processor, a server, electrical circuit, and an application-specific integrated circuit. In cases that the above-listed modules are realized by software, the database may be deployed on a server, while the registration module (20), the scheduling and managing module (10), the scene-editing module (40), the interaction module, the aiding module (70), the association-analyzing module (60) and the de-registration module (30) may be deployed at the user end. Of course, the above-listed modules may be deployed on multiple servers or multiple user ends according to practical needs, for example, the database, the scheduling and managing module (10), the scene-editing module and the association-analyzing module (60) are deployed on one or more server, while the registration module (20), the interaction module, the aiding module (70) and the de-registration module (30) may be deployed on one or more used end.

According to the present disclosure, the database at least comprises a scene database, a language database and a user information library. The scene database (50) and the language database may be deployed on a cloud, while the user information library may be stored at the user end locally, or may be generated or input to the user end in other ways by the user. The scene database (50) is used to store plural scenes corresponding to selected themes and scene elements corresponding to the scenes. The scene elements include background elements, object elements, character elements and sound elements. Scene information used for forming the background elements, object elements, character elements may be two-dimensional or three-dimensional. The language database is used to store language learning material, including voices, texts, as well as historical and cultural information related to the languages. The user information library is used to store browsing information, learning information, etc. related to users.

The registration module (20) is used to monitor a linking signal sent by a client and verify its validity. According to the validity of the user, a user account and user information are set on a server. Preferably, the client has a display apparatus that includes at least one display device and a display unit of a wearable device.

The scheduling and managing module (10) is used to manage time information of clients, and to identify current situations of virtual scenes through data exchange between the clients and the server. Preferably, the scheduling and managing module (10) schedules and manages information in response to requests raised by the modules.

The scene-editing module (40) is used to perform circular editing on the scene elements corresponding to conditions of the scenes, to present the edited interface to the clients, to receive movement operations input by the clients, and to provide responses according to the movement operations.

The aiding module (70) is used to provide assistance related to the second language according to first-language information collected from the user.

The association-analyzing module (60) is used to according to analyze scene elements or language information relates to at least one language of the user. The scene elements include but are not limited to pictures and scenes, either static or dynamic.

The de-registration module (30) is used to receive de-registration information from a client, to remove the relevant user from the server according to the de-registration information, and to store attribute data of the user in the server.

In a virtual scene of the prior art, the scene-editing module (40) sets a character that is in a live image transmitted by a client in a virtual scene, or integrates the facial images of a character in a live image with a virtual character to form a virtual character that can do lecture by means of live stream. Such a setup is unfavorable for a student to feel immersed into the virtual scene.

Therefore, the scene-editing module (40) of the present invention collects facial-expression information from live images of a user who is live streaming, and converts the facial expression information of the user into digital information, so as to display facial-expression information of the live-streaming user on the face of a virtual character in a virtual scene in a real-time manner. This setup prevents style difference between the face of the character and the virtual scene, thereby facilitating a student receiving the teaching information from a teacher in the virtual scene naturally. For example, a virtual character in a virtual scene may be an ancient Roman in 3D form, whose facial expressions correspond to the facial expressions of the livestreaming teacher. In this way, the teacher can save costs which could otherwise be required to purchase costumes matching the style of the virtual scene, and can teach ancient Roman culture or Italian culture with a corresponding foreign language more interestingly.

The present disclosure provides a language-learning system based on virtual scene of video communication, comprising: a scene-editing module (40) for acquiring a virtual character input via a student end by a user, and displaying the virtual character input by the user in a virtual scene of the student end and the teacher end, wherein the student end is used for acquiring video frames of the current student end collected during online study, which video frames include student expressions acquired by a video acquisition equipment at the student end; an association-analyzing module (60), which displays pre-selected associated images and/or pictures on the student end and the teacher end, and a teacher at the teacher end learns about language information expressed in a second language by the student. Preferably, the association-analyzing module (60) provides at least one association image and/or picture based on analysis of second language information input by the user, said "providing at least one association image and/or picture" is displayed in the current video frame in a manner that the association image and/or picture is prominent after analyzing the virtual scene comprising the virtual character displayed by at least one video communication equipment serving as the teacher end and the student end.

The language-learning system further comprises a scheduling and managing module (10), which is used for managing time information of the user end, and for confirming and/or adjusting current condition of the virtual scene based on data exchange between the user end and the server end. The scheduling and managing module (10) may be deployed at the central server, in order to execute confirming and/or adjusting the virtual scene, the scheduling and managing module (10), for example, comprises: a receiving unit, for receiving current video frame and virtual character from video communication equipment of the student end and the teacher end;

Preferably, the scene-editing module (40) is preferably deployed at the student end, which acquires images of the student using the video acquisition module of the student end, and generates the student virtual character using a processing module of the student end; preferably, the scene-editing module (40) is also deployed at the teacher end, which acquires images of the teacher using the video acquisition module of the teacher end, and generates the teacher virtual character using a process module of the teacher end.

Preferably, the association-analyzing module (60) is deployed on the same central server as the scheduling and managing module (10), which acquires virtual scenes comprising the virtual character and the corresponding current video frame provided by at least one video communication equipment serving as the teacher end and/or the student end with the processor of the central server, and the central server where the association-analyzing module (60) is deployed executes natural-language-based association analysis based on second language information input by the user, and provides at least one associated image and/or picture according to natural language analysis result. Preferably, associated images and/or pictures selected by corresponding users are displayed on the corresponding video communication equipment serving as the student end or the teacher end by the central server where the association analyzing module is deployed, so that teachers at the teacher end may learn about language information that the student expects to express in the second language through the associated images and/or pictures.

Preferably, in an embodiment of the present invention where communicative connection is established between a client serving as the student end or the teacher end and a smart wearable device and/or somatosensory device, the client sends movement information collected from a user of the smart wearable device and/or somatosensory device to the scene-editing module (40). The scene-editing module (40) applies the movement information of the user to a virtual character in a virtual scene, so that the movements of the virtual character are consistent with the movements of the user. Thereby, the virtual character in the virtual scene can replace the user to give lecture or speech in the virtual scene, and the user can be more immersed in the virtual scene.

For example, at Halloween, a teacher may use a wizard/witch as a Halloween-related virtual character to represent himself/herself, and makes the wizard/witch move like himself/herself does through his/her operation of a somatosensory device. In the virtual scene, a student can see the wizard/witch in the virtual scene using a second language to tell stories related to Halloween. This arrangement allows a teacher to talk about culture contents related to the second language with more enriched body movements and contents in the virtual scene. Particularly, in a three-dimensional virtual scene, a virtual character capable of performing body movements can act more vividly. For example, the virtual character may point out a certain virtual article and give information related thereto to make the course more interesting and attractive to the student.

When a student finds it difficult to express a certain idea in the second language, he/she may tend to use the first language, and this is unfavorable to his/her learning of the second language. With the disclosed system, such a student can use body movements to make up his/her oral expression in the second language, thereby maximizing his/her willingness to use the second language.

For example, when a student speaks in a virtual scene through a virtual character, the student can express his/her idea in the second language with the assistance of his/her body movements, and get fully understood by the teacher and/or other students, thereby ensuring effective communication between the student and the teacher and/or other students, which is essential to relevant feedback and instruction. In addition, expressions in the second language accompanied by body movements of the speakers can add the communication with amusement and personal styles, making language learning always exciting. This also ensures that the teacher can accurately understand the student having difficulty in expressing himself/herself in the second language, and gives the teacher opportunities to correct the defective oral communication of the student in a real-time manner.

In the context of language learning, a student is typically not familiar to the second language, or any language he/she is now learning, and it is common that such a student makes wrong or insufficient expressions in the second language expression pr another foreign language. In a case where a teacher and a student come from different countries and thus have different first languages, any mistake in an expression of the student can prevent the teacher from fully or accurately understanding the student. Consequently, the teacher is likely to fail to give effective correction and/or instruction to the student in terms of language, making learning efficiency degraded.

In the present invention, the association-analyzing module (60) analyzes the language pronunciation in a live-streaming room or a virtual scene made by the user at the client, and display an image associated with the speaking of the user. In the event that the expression made by the student in the second language is not correct, a teacher can ascertain what the student is trying to express according to the displayed image, and then correct the second-language expression of the student through repeated communication. In this way, communication between the teacher and the student can be significantly improved, thereby saving class time.

Preferably, provision of associated images may be initiated by not only the second-language speaking of users, but also by first-language expressions made by users.

Preferably, the association-analyzing module (60), according to second-language pronunciation made at a client, provides the client with at least one associated image. Where the client specifies at least one associated image provided by the association-analyzing module (60), the association-analyzing module (60) displays the specified image in the virtual room or the virtual scene, thereby enhancing consistency between the provided image and the speaking of the user.

By considering pronunciation or text expression made by the student in conjunction the associated image provided by the system, a teacher can better understand what the student is trying to express, and thus can accurately evaluate and correct the student.

For example, the clients may include a teacher end and a student end. The student end selects an image that most matches his/her language expression from the plural associated image association-analyzing module (60) provided as the specified associated image. The association-analyzing module (60) displays the associated image selected by the student end in the virtual scene or the virtual room for the teacher end and other student ends to see and thereby better understand the expression of the speaking student.

Specifically, the association-analyzing module (60), according to voice information input by a student using the second language, repeatedly show several category information and specific associated images of articles whose names sound like the pronunciation made by the user. The association-analyzing module (60), according to the category information specified by the student, narrows the scope of associated images with the attempt to enhance consistency between the associated images and the speaking of the user.

For example, when a student specifies "Holidays" in terms of category information, and further specifies "Events" as the sub-category. The association-analyzing module (60) may display Christmas socks as the associated image according to the voice information, "happy, dance, in socks," in the second language.

Similarly, when a teacher and a student have their first languages different, the teacher end can select an associated image to be displayed, and the student can refer to the image when taking in the oral expression made by the teacher.

Preferably, the association-analyzing module (60) serves to not only provide associated images, but also analyze and present scenes associated with the language. In embodiments where the teacher end grants change of scenes, the association-analyzing module (60) sends key words obtained by analyzing the language information of the student to the student end. In the event that the student end makes selection of specific key words, the association-analyzing module (60) sends the key words to the scene-editing module (40). The scene-editing module (40) according to the key words shows at least one relevant virtual scene in the virtual classroom.

As the speaking contents or topics of the student or the teacher change, the associated images or relevant virtual scenes change accordingly. The associated images or the relevant virtual scenes may be changed by operations made at the teacher end or the student end, or may change automatically at a predetermined time interval.

To recognize good language-speaking performance of the student, the teacher end may specify an image or virtual scene associated with praise or compliment through the association-analyzing module. For example, encouraging scenes such as raining red envelopes, blooming flowers, or character dancing may be presented to inspire the student.

Preferably, the aiding module provides at least a primary aid and a secondary aid. The primary aid refers to several key words in the second language and/or the third language according to words in a language other than the second language provided by the student. The student can use the several key words as the primary aid provided by the aiding module to compose his/her expression in the second language and/or the third language.

For example, when the aiding module (70) is in its primary aid mode, the aiding module (70), according to some words in the first language input by the student or according to articles, characters, or behaviors specified in the virtual scene by the student, provides several corresponding key words in the second language. For students learning languages, particularly learning oral expressions, sentence patterns are of high importance. As long as a student can use sentence patterns correctly, he/she can make meaningful expressions even if some vocabularies are not certain to him/her. Therefore, in the event that a student wants to make and expression in the form of a complete sentence but needs help with some words, the student may use the key words provided by the aiding module (70) as the primary aid to compose sentences.

The secondary aid is about translation. In the event the student still finds it difficult to make expressions even with the aid of the key words, the student may ask the aiding module (70) to provide the secondary aid by his/her operation at the client. In the secondary aid mode, the aiding module (70), according to the input made by the student in the first language, provides at least two template sentences. Preferably, the template sentences may be just the translated versions of the original input, or may be something just grammatically similar. For example, the template sentences are suitable for what the student wants to express in terms of grammatical structure, so the student can replace nouns in the templates with his/her select words to form his/her expression. In one embodiment, a template sentence fully translates the first language content input by the student into the second language and/or the third language is presented to the teacher end only, so that the teacher can understand what the student wants to express. This prevents the student from unduly relying on the assistance from the aiding module (70), and pushes the student to try his/her best to autonomously express himself/herself using the second language, rather than just reading out the template sentence. With full knowledge about what the student wants to express, the teacher can initiate instructive interaction to help the student with correct expressions in the second language and/or the third language.

Preferably, in a self-learning mode, with the secondary aid active, the aiding module (70) can translate the content input by the student in the first language into the second language and/or the third language, and shows the translated version at the student end for the student to perform self-learning. In a case where a student is learning the second language and the third language at the same time, the aiding module (70) may according to instructions form the student end displays contents in the second language and the third language simultaneously.

Preferably, where the student is a beginner at the second language and/or the third language, the student may be inferior in listening and likely to miss the contents expressed in the second language and/or the third language during communication. The aiding module (70) can similarly according to the selection made at the student end displays at the student end a first language text version of what the student is hearing in the second language and/or the third language, thereby facilitating quick understanding and learning of the student.

Communication is an excellent way for a student to practice and learn a language effectively. However, students can often hang back from speaking in fear that their expressions are not perfect. With the primary aid and the secondary aid, a student can interact with co-learner in a virtual scene using the second language. With the help of the aiding module (70), the student can repeatedly practice his/her speaking by using the sentence patterns and words of interest, so as to get familiar with the second language.

Preferably, a student and a teacher may communicate with each other as two characters in a virtual scene. For example, in a store scenario, there may be salespersons, managers, cleaning staff, shoppers and more roles. Every character depending on its role has its own key words for communication. If the student is not familiar with the key words associated with his/her character, the role play is difficult.

With the aiding module (70) set in the primary aid mode, key words can be provided according to the roles of the virtual characters at the corresponding clients. These role-specific key words may be those for daily use of the character. The student can then use the key words to talk to other characters in the same virtual scene and thereby practice his/her oral expression in the second language. Where the oral expression of the student is faulty, the teacher may give correction through communication with the student in the virtual scene. With the aiding module (70) in the secondary aid mode, the student can alternatively read the complete sentences the system provides.

Preferably, during each virtual scene, communication among the characters therein may be saved by a storage module. When a student wants to review a virtual scene he/she participated in, the scene-editing module (40) signals the storage module to extract the saved content of the virtual scene within the specified time period, so that the student can review his/her performance and identify his/her mistakes to weakness. This also gives the student opportunities to can observe and learn from other characters.

Preferably, during each virtual scene, communication among the characters therein may be saved by a storage module. When a student wants to review a virtual scene he/she participated in, the scene-editing module signals the storage module to extract the saved content of the virtual scene within the specified time period, so that the student can review his/her performance and identify his/her mistakes to weakness. This also gives the student opportunities to can observe and learn from other characters.

Generally, the virtual scenes are built systematically. For example, a virtual scene may contain a complete city, such as an ancient Roman city. More buildings in the virtual scene means that there are more occasions for virtual characters representing students and teachers to meet and talk. However, an excessive large virtual scene and a large number of possible interactive places can be obviously unfriendly to teachers who want to observe and instruct students in a timely manner. On the other hand, a small virtual scene may be monotonous. Even when such small virtual scenes combined, their inconsistent styles make it impossible to form an integrated geographic area. Consequently, students acting in these distinct scenes can feel confused. It is therefore desired that virtual scenes are planned and built in a systematical way for students to form a complete geographic logic in mind. In use, the teacher end may define the border of a virtual scene according to his/her teaching needs. This helps to concentrate students to communicate in the second language around a theme at geographic locations in the virtual scene that are relevant and reproduceable.

The present invention is different from the prior art for that its scene-editing module (40) can set the border for a virtual scene and apply the border to a specific learning session according to instruction form a client. Preferably, the client is a teacher end that has authority for configuration of virtual scenes.

In the present invention, the scene-editing module (40) may include a three-dimensional scene module (42) and a two-dimensional scene module (41). The scene-editing module (40) can display three-dimensional virtual scenes and two-dimensional virtual scenes as well as their attributes in parallel views at a client. The three-dimensional scene module (42) displays a three-dimensional virtual scene at clients in the form of a video stream. Both of the three-dimensional scene module (42) and the two-dimensional scene module (41) can adjust virtual scenes of the corresponding dimensions in terms of image definition and display scope according to operations for users.

The parallel view mode, either for the three-dimensional scene module (42) or for the two-dimensional scene module (41), is advantageous for taking less network bandwidth, small work load, and less data delay, leading to significantly improved working efficiency for view display. Preferably, the two-dimensional virtual scene and the three-dimensional virtual scene can operate synchronously.

For example, the two-dimensional scene module (41) displays images of a two-dimensional city map, and the three-dimensional scene module (42) displays images of three-dimensional virtual scenes.

Preferably, in an embodiment where the two-dimensional virtual scene is divided into different DOF areas each in a geometric shape according to custom configuration, the three-dimensional scene module in response to a DOF area specified by a client, displays three-dimensional virtual scene within the DOF area. At this time, virtual characters representing students in the three-dimensional virtual scene are restricted to move and use the second language inside the designated DOF area. In this way, a teacher can easily oversee the students acting in the DOF area and provide timely evaluation and instruction.

For example, the teacher at the teacher end may use geometric shapes to define DOF areas of a three-dimensional virtual scene in the displayed two-dimensional virtual scene. Then the two-dimensional scene module (41) sends the DOF information to the three-dimensional scene module (42). The three-dimensional scene module (42) in response to its receipt of the DOF information, displays the DOF areas in the three-dimensional virtual scene.

For the purpose of the present invention, a DOF represents to a display scope in which images can be presented in a display clearly when a view of a limited distance is acquired. A DOF area refers to a three-dimensional virtual area in which virtual objects can be displayed clearly and can move around.

An area defined in a two-dimensional virtual scene may be a specified DOF scope. A DOF scope may contain therein several virtual objects. For a DOF area defined by a user, the three-dimensional scene module (42) displays virtual objects in the DOF scope according to the specified virtual scene.

In the present invention, the three-dimensional scene module (42) presents a three-dimensional virtual scene containing virtual objects in the DOF scope according to the request data about the DOF scope specified in the two-dimensional virtual scene.

Preferably, the three-dimensional scene module (42) adaptively adjusts resolution of virtual objects according to information about an operation by which the user requires to view the virtual objects. When the user views the virtual objects in the specified DOF area and their attributes, the view is clear. When the view of the user reaches the edge of the DOF area, the part of the three-dimensional virtual scene within the edge is of high definition, while the image quality of the part outside the edge is significantly reduced, indicating that the current is out of the DOF area and warning the virtual characters representing students not to move outside the edge, thereby preventing invalid movement and communication of the virtual characters representing the students.

The resolution of the virtual object can be adjusted by operation from the user, so that the resolution of the virtual scene varies according to operational needs. In this way, users can view the virtual scene around the communication theme selected by the teacher and interact with co-learners in the second language, preventing aimless wander and rove.

Preferably, for a student who has problem in oral communication, the association-analyzing module (60) warns the two-dimensional scene module (41) about this. Then the two-dimensional scene module (41) highlights the two-dimensional virtual scene in which the virtual character triggering the alert information is present and student information related to that virtual character using a prominent vivid color and/or mark. This means that the user can clear see the two-dimensional virtual scene of the virtual character who triggers the alert in his/her own two-dimensional virtual scene. Then a teacher at a teacher end can check the student with problems and give instruction purposefully.

Without setting a DOF area, for a teacher at a teacher end overseeing students in a three-dimensional virtual scene, the three-dimensional scene module (42) could only display all the virtual objects in the current three-dimensional virtual scene with high definition but there are actually many virtual objects and their attributes that are not currently of interest of the teacher and the students. By doing so, the three-dimensional scene module (42) might send too many unnecessary data to the clients, leading to data delay and slow update of the three-dimensional virtual scene at the client, seriously degrading user experience.

With DOF areas set as proposed by the present invention, the three-dimensional scene module (42) can significantly reduce the amount of data it sends to the clients. The three-dimensional scene module (42) sifts the three-dimensional virtual objects according to a list of DOF areas and virtual objects in the DOF areas provided by the two-dimensional scene module (41), and sends high-definition data of those objects and their attribute data to the clients. In other words, the three-dimensional scene module (42) can purposefully select and transmit data according to the DOF areas, thereby minimizing unnecessary data transmission.

Preferably, DOF areas can be set in not only two-dimensional virtual scenes, but also three-dimensional virtual scenes. When an operator defines a DOF area in a three-dimensional virtual scene, the three-dimensional virtual scene can generate a list of virtual objects in the DOF area by making a search in the DOF area. The user then can check the information he/she needs according to this list.

Preferably, in the present invention, the editing module may include a text expression module for users to input text contents into virtual scenes. The text expression module can convert the text contents shown in the virtual scene into text expressions in the second language or the third language. After creating text expression contents, a student end may send the edited information to the scene-editing module (40). The scene-editing module (40) then in response to the edited information sends virtual scene locations associated with the text expression module to the teacher end and/or sends the text expression contents directly to the teacher end. A teacher at the teacher end can then revise, evaluate or rate the text expression contents.

For example, a student may read and learn culture and history about the second language in a virtual scene, or may alternatively learn the culture and history by way of answering questions on the virtual scene. In addition, the disclosed language-learning system may display the scores and ranks of students according to evaluation made by a teacher.

Preferably, the language-learning system of the present invention further comprises a reviewing module. The reviewing module is configured to provide different means of review according to capability of students for using the second or third language to make expressions as well as intervals of classes. The capability for using the second or third language to make expressions may be measured by scores or marks that contain colors, images and any combination thereof.

For example, first, for a student learning a certain language through virtual scenes of the present invention, when it has been not long from the last session and the student got a high rank in that session, the reviewing module shows at least one virtual scene associated with the language knowledge content, and provides a virtual game as a way to consolidate what the student has learnt. Herein, "not long" refers to a time period not longer than one month.

Secondly, when it has been long from the last session and the student got a medium rank in that session, the student is likely to forget something he/she learned from the session. In this case, the reviewing module may evoke memories of the learning contents for the student by setting a series of questions. Herein, "long" refers to a time period longer than one month.

Thirdly, when it has been long from the last session and the student got a poor rank in that session, it is probable that the student has forgotten all the learning contents. In this case, the reviewing module sends information about the virtual scenes related to the knowledge contents to be recalled to the scene-editing module (40). The scene-editing module (40), in response to the request made by the reviewing module, consults the storage module to get the learning contents in the corresponding virtual scene and voice information of some participating students collected previously in that session to restore that session to the maximum extent for the student to learn the contents again. At this time, activities of the other characters in the virtual scene are recovered by playing back a record of that session.

Preferably, the teacher end may use the scene-editing module (40) to set an incentive threshold and incentive contents. The incentive contents may include but is not limited to images shown in virtual scenes or a film. When a student is rated as satisfying the incentive threshold, an incentive mechanism is triggered, and then the student may watch the incentive image in the virtual scene. For example, the incentive image in the virtual scene may include an ancient Roman Colosseum and a contest therein, for the student to learn more about the cultural background oof second language or third language in an interesting way.

The present invention has been described with reference to the preferred embodiments and it is understood that the embodiments are not intended to limit the scope of the present invention. Moreover, as the contents disclosed herein should be readily understood and can be implemented by a person skilled in the art, all equivalent changes or modifications which do not come off the concept of the present invention should be encompassed by the appended claims.

The description of the present invention contains a number of inventive concepts, and the applicant reserves the right to file a divisional application based on each of the inventive concepts. The description of the present invention contains a number of inventive concepts, such as "preferably", "according to a preferred embodiment" or "optionally" all indicate that the corresponding paragraph discloses an independent idea, and the applicant reserves the right to file a divisional application based on each of the inventive concepts.

What is claimed is:

1. A virtual-scene-based language-learning system, comprising a first client device in communication with at least one second client device, wherein the system allows for communication between the first client device and the at least one second client device;

the system further comprising at least one processor;

the at least one processor comprising: a scheduling and managing module, a scene-editing module, and an association-analyzing module;

the scheduling and managing module is connected to the scene-editing module and the association-analyzing module, respectively, in a wired or wireless manner;

wherein the association-analyzing module analyzes pronunciation of words of a first language of a first input to the first client device in a live-streaming room or a virtual scene, and displays at least one associated image and/or picture associated with the words of the pronunciation of the first language spoken by the first input;

the association-analyzing module further displays the at least one associated images and/or picture on the at least one second client device, such that the at least one second client device displays the at least one image and/or picture associated with the pronunciation of words of the first language expressed in the first language information input on the second client device;

wherein the scene-editing module comprises a two-dimensional scene module and a three-dimensional scene module and, wherein the scene-editing module displays two-dimensional virtual scenes and three-dimensional virtual scenes in a parallel manner, via the two-dimensional scene module and the three-dimensional scene module;

wherein the association-analyzing module warns the two-dimensional scene module a communication problem has occurred and provides an alert;

wherein the first client device and two-dimensional scene module relays the alert to the second client device;

wherein the association-analyzing module analyzes based on a pronunciation of second language input and provides at least one associated image and/or picture, the association-analyzing module displays the associated image and/or picture at the first client device, the at least one second client device is able to portray the associated image and/or picture on the first client device to express the first language information in the pronunciation of the second language input;

wherein the scene-editing module, in response to edits made by the user to the two-dimensional virtual scene, displays a corresponding three-dimensional virtual scene in a three-dimensional view.

2. The virtual-scene-based language-learning system of claim 1, wherein the scene-editing module, according to a movement information input by at least one smart wearable device and/or somatosensory device, controls movement of a virtual character to mimic movements of the at least one smart wearable device and/or somatosensory device, thereby allowing the at least one smart wearable device and/or somatosensory device to perform interaction in a virtual scene based on a combination of the pronunciation of the first and/or second language input and a movement language.

3. The virtual-scene-based language-learning system of claim 1, wherein the scene-editing module, according to a facial-expression information of an input by at least one smart wearable device and/or somatosensory device, modulates facial-expression information of an associated virtual character, thereby allowing the input to communicate in a virtual scene using lifelike facial expressions and the second language.

4. The virtual-scene-based language-learning system of claim 1, wherein the system further comprises an aiding module, the aiding module, according to the first-language information input by the first client device, provides at least one second-language key word associated with the first-language information for the first client device to express information in the second language, and/or the aiding module, according to first-language information input by the first client device, provides at least one template sentence expressed in the second language for the first client device to express the information in the second language.

5. The virtual-scene-based language-learning system of claim 4, wherein the aiding module, according to a virtual object in the virtual scene designated by the first client device, displays at least one associated word or sentence using a designated second language and/or third language.

6. The virtual-scene-based language-learning system of claim 4, wherein the aiding module, according to daily use frequency of the second-language key words associated with virtual objects in virtual scenes, sets a display order of the second-language key words.

7. A virtual-scene-based language-learning device, comprising a first client device in communication with at least one second client device, wherein the system allows for communication between the first client device and the at least one second client device;

the system further comprising at least one processor;

the at least one processor comprising: a scheduling and managing module, a scene-editing module, and an association-analyzing module;

the scheduling and managing module is connected to the scene-editing module and the association-analyzing module, respectively, in a wired or wireless manner, wherein the association-analyzing module analyzes pronunciation of words of a first language of a first input to the first client device in a live-streaming room or a virtual scene, and displays at least one associated image and/or picture associated with the words of the first language spoken by the first input;

the association-analyzing module further displays the at least one associated images and/or picture on the at least one second client device, such that the at least one second client device displays the at least one image and/or picture associated with the pronunciation of words of the first language expressed in the first language information input on the second client device;

wherein the scene-editing module comprises a two-dimensional scene module and a three-dimensional scene module and, wherein the scene-editing module displays two-dimensional virtual scenes and three-dimensional virtual scenes in a parallel manner, via the two-dimensional scene module and the three-dimensional scene module;

wherein the association-analyzing module warns the two-dimensional scene module a communication problem has occurred and provides an alert, and wherein the scene-editing module, in response to edits made by the user to the two-dimensional virtual scene, displays a corresponding three-dimensional virtual scene in a three-dimensional view.

8. The virtual-scene-based language-learning device of claim 7, wherein the scene-editing module, according to a movement information input by at least one smart wearable device and/or somatosensory device, controls movement of a virtual character to mimic movements of the smart wearable device and/or somatosensory device, thereby allowing the smart wearable device and/or somatosensory device to perform interaction in a virtual scene based on a combination of the pronunciation or the first and/or second language input and a movement language.

9. A language-learning system based on virtual scene of video communication, comprising:

a scene-editing module for acquiring a virtual character input via a first client device, and displaying the virtual character input by the first client device in a virtual scene of the first client device and a second client device, wherein the first client device is used for acquiring video frames of the current first client device collected during online study, which video frames include expressions acquired by a video acquisition equipment at the first client device; an association-analyzing module, which displays pre-selected associated images and/or pictures on the first and second client devices, and the second client device learns about language information expressed in a second language by the first client device;

wherein the association-analyzing module analyzes pronunciation of words of a first language of a first input to the first client device in a live-streaming room or a virtual scene, and displays at least one associated image and/or picture associated with the words of the pronunciation of the first language spoken by the first input;

wherein the scene-editing module comprises a two-dimensional scene module and a three-dimensional scene module and, wherein the scene-editing module displays two-dimensional virtual scenes and three-dimensional virtual scenes in a parallel manner, via the two-dimensional scene module and the three-dimensional scene module;

wherein the association-analyzing module warns the two-dimensional scene module a communication problem has occurred and provides an alert, and wherein the scene-editing module, in response to edits made by the user to the two-dimensional virtual scene, displays a corresponding three-dimensional virtual scene in a three-dimensional view.

10. The language-learning system of claim 9, wherein the association-analyzing module provides at least one association image and/or picture based on analysis of second language information input by the first client device, said providing at least one association image and/or picture is displayed in the current video frame in a manner that the association image and/or picture is displayed after analyzing the virtual scene comprising the virtual character displayed by at least one video communication equipment serving as the second client device.

11. The language-learning system of claim 9, wherein the language-learning system further comprises a scheduling and managing module, which is used for managing time information of the first client device, and for confirming and/or adjusting current condition of the virtual scene based on data exchange between the first client device and the server end.

12. The language-learning system of claim 11, wherein the scheduling and managing module comprises:

a receiving unit, for receiving current video frame and virtual character from video communication equipment of the first client device and the second client device; a matching unit, for matching the received current video frame and virtual character, so as to obtain the current video frame after matching and replace the scene in the current video frame into a virtual scene; wherein the matching unit performs matching and adjustment to the received current video frame, virtual character and virtual scene, wherein the step of matching and adjustment comprises: identifying, and acquiring facial part of the current video frame and matching the facial part with the virtual character so as to obtain the current video frame after matching, and adjusting the virtual scene according to the current video scene after matching; or perforating cropping and/or reduction to the current video scene according to the virtual scene, and matching the result of the cropping and/or reduction with the virtual character so as to obtain the current video frame after matching; the matching unit further comprises a motion/expression acquisition module for the virtual character, so as to obtain the motion and/or expression of the virtual character input by the first client device; and a display generation unit, which integrates the virtual character and virtual scene after matching into adjusted video frame, and sending the adjusted video scene to the first client device and the second client device, wherein the adjusted video scene is fused with the motion and/or expression of the virtual character.

13. The language-learning system of claim 12, wherein the scene-editing module is deployed at the first client device, which acquires images using the video acquisition module of the first client device, and generates the virtual character using a processing module.

14. The language-learning system of claim 13, wherein the scene-editing module is also deployed at the second client device, which acquires images using the video acquisition module of the second client device, and generates the virtual character using a process module.

15. The language-learning system of claim 9, wherein the association-analyzing module is deployed on the same central server as the scheduling and managing module, which acquires virtual scenes comprising the virtual character and the corresponding current video frame provided by at least one video communication equipment serving as the second client device and/or the First client device with the processor of the central server, and the central server where the association-analyzing module is deployed executes natural-language based association analysis based on second language information input, and provides at least one associated image and/or picture according to natural language analysis result.

16. The language-learning system of claim 15, wherein associated images and/or pictures selected by corresponding client devices are displayed on the corresponding video communication equipment serving as the first client device or the second client device by the central server where the association-analyzing module is deployed, so that the second client device may learn about language information that the first client device expects to express in the second language through the associated images and/or pictures.

17. The language-learning system of claim 9, wherein the scene-editing module, according to a movement information input by at least one smart wearable device and/or somatosensory device, controls movement of a virtual character to mimic movements of the smart wearable device and/or somatosensory device, thereby allowing the smart wearable device and/or somatosensory device to perform interaction in a virtual scene based on a combination of the pronunciation of the first and/or second language input and a movement language.

18. The language-learning system of claim 9, wherein the scene-editing module, according to a facial-expression information of an input by at least one smart wearable device and/or somatosensory device, modulates facial-expression information of an associated virtual character, thereby allowing the input to communicate in a virtual scene using lifelike facial expressions and the second language.

* * * * *